US011670012B2

(12) United States Patent
Rehfeld et al.

(10) Patent No.: US 11,670,012 B2
(45) Date of Patent: *Jun. 6, 2023

(54) ENCODING AND DECODING A STYLIZED CUSTOM GRAPHIC

(71) Applicant: Snap Inc., Santa Monica, CA (US)

(72) Inventors: Drake Austin Rehfeld, Glendora, CA (US); Rahul Bhupendra Sheth, Los Angeles, CA (US); Ning Zhang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 17/302,361

(22) Filed: Apr. 30, 2021

(65) Prior Publication Data

US 2021/0256736 A1 Aug. 19, 2021

Related U.S. Application Data

(63) Continuation of application No. 16/846,949, filed on Apr. 13, 2020, now Pat. No. 11,024,058, which is a continuation of application No. 16/022,536, filed on Jun. 28, 2018, now Pat. No. 10,657,676.

(51) Int. Cl.
*G06T 9/00* (2006.01)
*H04L 51/52* (2022.01)
*G06N 3/047* (2023.01)

(52) U.S. Cl.
CPC ............. *G06T 9/002* (2013.01); *G06N 3/047* (2023.01); *H04L 51/52* (2022.05)

(58) Field of Classification Search
CPC ........ G06T 9/002; G06N 3/0472; H04L 51/32
See application file for complete search history.

(56) References Cited

U.S. PATENT DOCUMENTS

| 7,593,961 | B2 | 9/2009 | Eguchi et al. |
| 10,657,676 | B1 | 5/2020 | Rehfeld et al. |
| 11,024,058 | B2 | 6/2021 | Rehfeld et al. |
| 2001/0016051 | A1 | 8/2001 | Rhoads |

(Continued)

OTHER PUBLICATIONS

"U.S. Appl. No. 16/022,536, Corrected Notice of Allowability dated Feb. 28, 2020", 6 pgs.

(Continued)

*Primary Examiner* — Chuong A Ngo
(74) *Attorney, Agent, or Firm* — Schwegman Lundberg & Woessner, P.A.

(57) ABSTRACT

Disclosed are methods for encoding information in a graphic image. The information may be encoded so as to have a visual appearance that adopts a particular style, so that the encoded information is visually pleasing in the environment in which it is displayed. An encoder and decoder are trained during an integrated training process, where the encoder is tuned to minimize a loss when its encoded images are decoded. Similarly, the decoder is also trained to minimize loss when decoding the encoded images. Both the encoder and decoder may utilize a convolutional neural network in some aspects to analyze data and/or images. Once data is encoded, a style from a sample image is transferred to the encoded data. When decoding, the decoder may largely ignore the style aspects of the encoded data and decode based on a content portion of the data.

16 Claims, 10 Drawing Sheets

(56) References Cited

U.S. PATENT DOCUMENTS

| | | | |
|---|---|---|---|
| 2016/0328630 A1* | 11/2016 | Han | G06V 10/454 |
| 2018/0091819 A1 | 3/2018 | Cook et al. | |
| 2019/0108651 A1* | 4/2019 | Gu | G06N 3/00 |
| 2019/0138860 A1 | 5/2019 | Liu et al. | |
| 2020/0242812 A1 | 7/2020 | Rehfeld et al. | |

OTHER PUBLICATIONS

"U.S. Appl. No. 16/022,536, Notice of Allowance dated Jan. 14, 2020", 8 pgs.

"U.S. Appl. No. 16/846,949, Non Final Office Action dated Sep. 24, 2020", 14 pgs.

"U.S. Appl. No. 16/846,949, Notice of Allowance dated Feb. 3, 2021", 9 pgs.

"U.S. Appl. No. 16/846,949, Response filed Dec. 17, 2020 to Non Final Office Action dated Sep. 24, 2020", 8 pgs.

Dosovitskuy, Alexey, et al., "Learning to Generate Chairs with Convolutional Neural Networks", Conference on Computer Vision and Pattern Recognition (CVPR), (2015), 9 pgs.

Gatys, Leon A., et al., "Image Style Transfer Using Convolutional Neural Networks", IEEE Conference on Computer Vision and Pattern Recognition (CVPR), Las Vegas, NV, (Jun. 27-30, 2016), 2414-2423.

Grinchuk, Oleg, et al., "Learnable Visual Markers", Skolkovo Institute of Science and Technology, Moscow, Russia, (2016), 9 pgs.

Johnson, Justin, et al., "Perceptual Losses for Real-Time Style Transfer and Super-Resolution", arXiv preprint, arXiv:1603.08155v1, (Mar. 27, 2016), 18 pgs.

Kingma, Diederik P, et al., "Auto-Encoding Variational Bayes", arXiv:1312.6114v10, (2014), 14 pgs.

Lecun, Y., et al., "Backpropagation Applied to Handwritten Zip Code Recognition", Neural Computation, 1(4), (1989), 541-555.

Zeiler, Matthew D., et al., "Adaptive Deconvolutional Networks for Mid and High Level Feature Learning", International Conference on Computer Vision (ICCV), (2011), 8 pgs.

\* cited by examiner

US 11,670,012 B2

ENCODING AND DECODING A STYLIZED CUSTOM GRAPHIC

CLAIM OF PRIORITY

This application is a continuation of U.S. patent application Ser. No. 16/846,949, filed on Apr. 13, 2020, which is a continuation of U.S. patent application Ser. No. 16/022,536, filed on Jun. 28, 2018, each of which are incorporated herein by reference in their entireties.

TECHNICAL FIELD

The present disclosure generally relates to the technical field of encoding and decoding. Specifically, embodiments encode and decode bit strings using machine learning algorithms.

BACKGROUND

Uses for social networks are expanding. Originally conceived as a method to make it easier to keep in touch with friends, social networks are now providing front end functionality for a variety of Internet capabilities, including news, ecommerce, messaging, classified advertisement, and other features. To that end, the easier it is for users to employ the features of social networks to solve problems specific to their needs, the more readily the users adopt these features. Therefore, improvements in the ease of use of social networking features are desirable.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The description that follows includes systems, methods, techniques, instruction sequences, and computing machine program products that embody, illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The disclosed embodiments may provide for encoding of a user defined bit string into a visual image. The visual image may then be distributed by the user. Later, other users, or the creating user in some aspects, may scan the visual image to identify the bit string. Previous solutions to this problem presented an unappealing visual appearance. For example, Q/R codes, while functional, may visually subtract from an environment in which they appear. Thus, it may be desirable to create a visual appealing way of encoding information that may more readily be adopted into a visual environment, without unduly burdening the visual environment with technical appearing designs.

To accomplish this, an encoder and decoder are trained as a pair to encode and decode bit strings. The training is accomplished by tuning the encoder and decoder to minimize a loss occurring during the combined encoding and decoding process. After the encoder encodes a bit string, the resulting image data is made more visually appealing by transferring style information from a sample style image to the image data encoding the bit string. The visually appealing image data is then placed within a graphic. When a user attempts to decode the graphic, first, an image containing the graphic is scanned. The graphic may then be detected in the scanned image, image data is then extracted from the graphic, and decoded by the decoder to identify the encoded bit string. The encoded bit string may represent one or more operations to be performed by a social network after its decoding. In some aspects, the encoded bit string encodes actual instructions for the social network, such as those included in an intermediate language like Common Intermediate Language (CIL) or in a scripting language such as Perl or Python. In some other embodiments, a social network may maintain a database, or other stable storage to store a mapping from bit string information to one or more operations. When a bit string is encoded, a mapping entry for the bit string may be added to the table. The table may identify operations to perform when the bit string is decoded.

Figure 1:
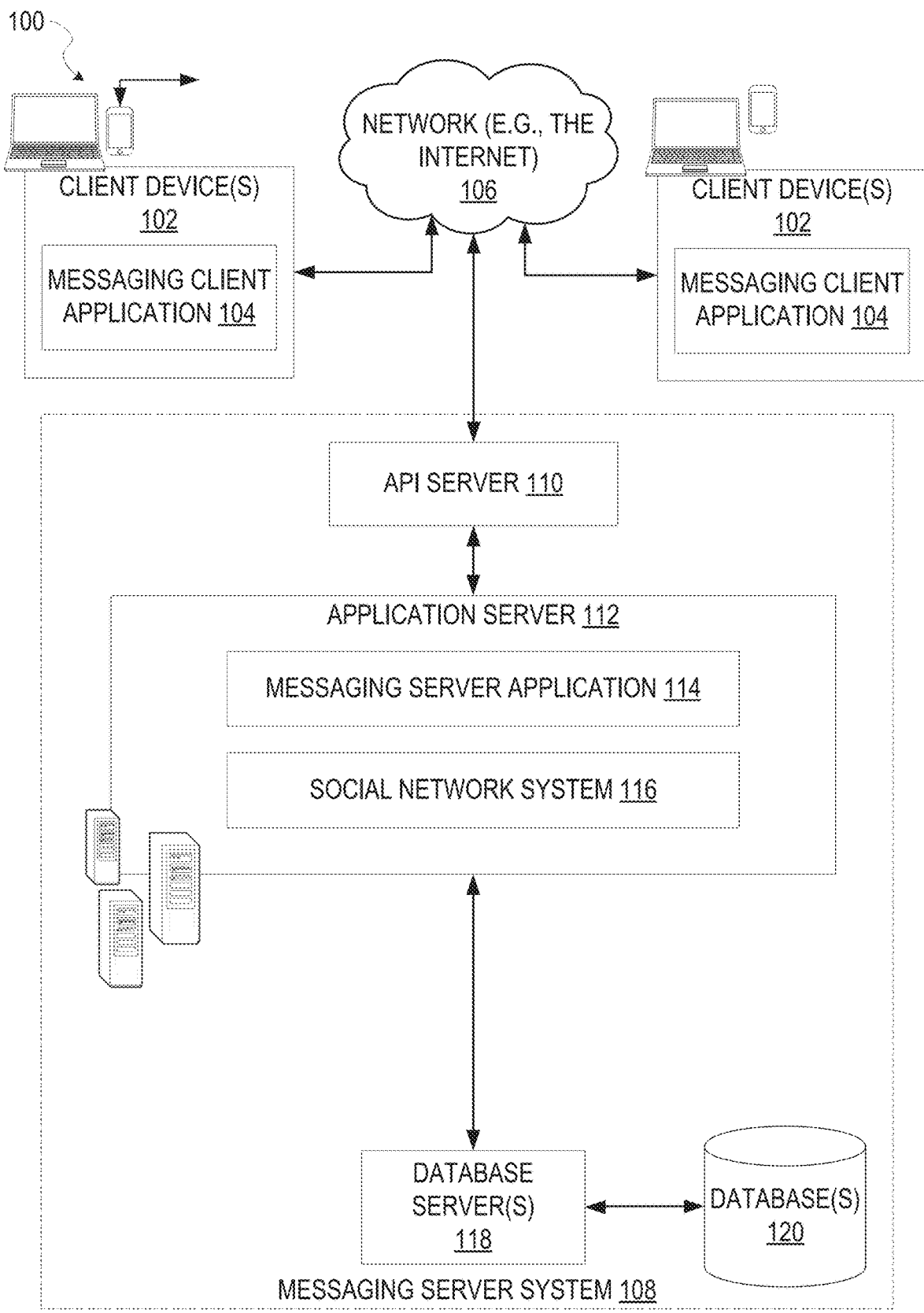
FIG. 1 is an exemplary block diagram of a messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104, Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104, Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (Us) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Figure 2:
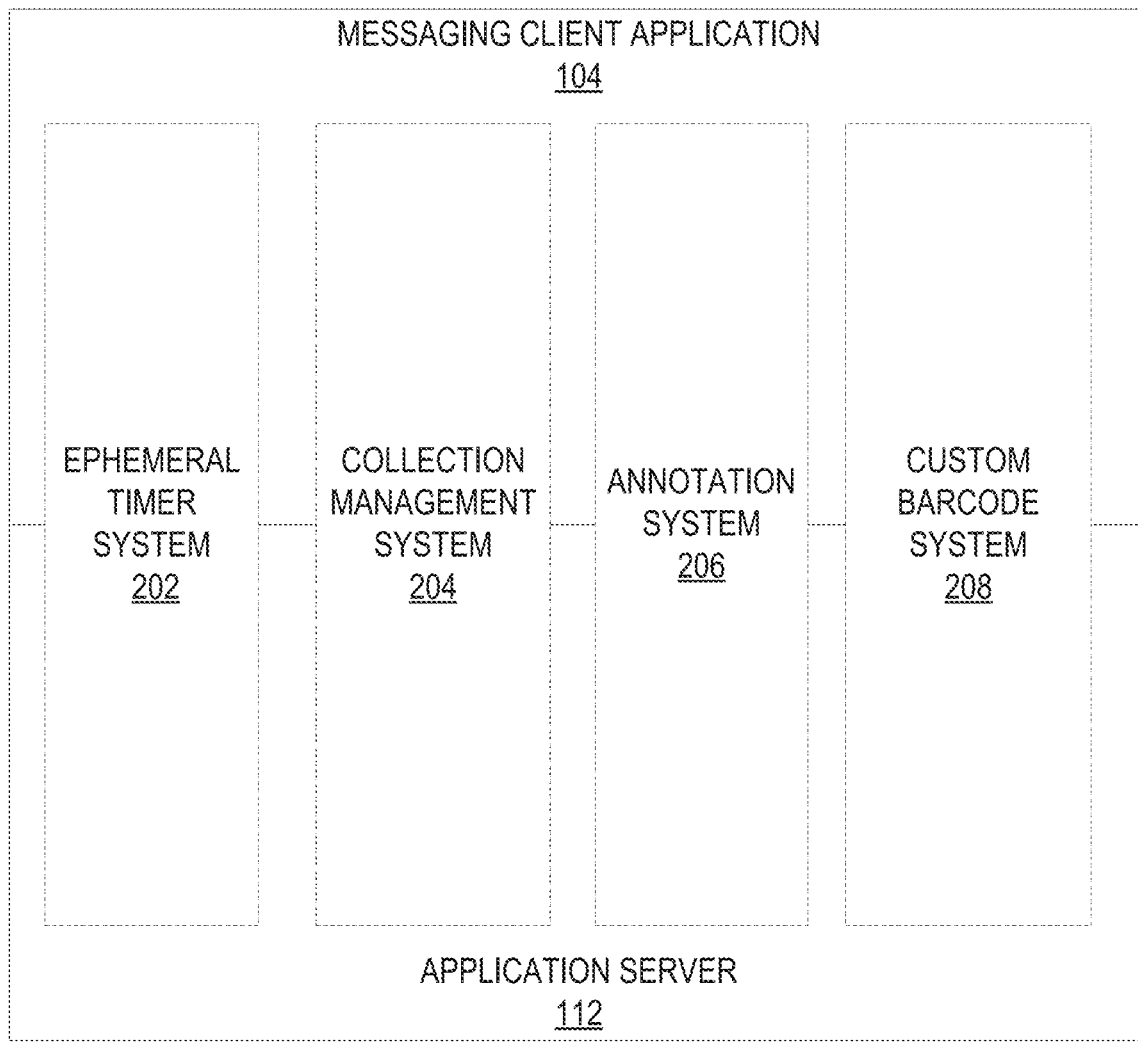
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, an annotation system 206, and an encoder-decoder system 208.

The ephemeral timer system 202 is responsible for enforcing the temporary access to content permitted by the messaging client application 104 and the messaging server application 114. To this end; the ephemeral timer system 202 incorporates a number of timers that, based on duration and display parameters associated with a message, or collection of messages (e.g., a SNAPCHAT story, such as the story component 404 discussed below), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The annotation system 206 provides various functions that enable a user to annotate or otherwise modify or edit media content associated with a message. For example, the annotation system 206 provides functions related to the generation and publishing of media overlays for messages processed by the messaging system 100. For example, the annotation system 206 operatively, supplies a media overlay to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another exemplary embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The encoder-decoder system 208 may provide for encoding and decoding of custom barcode information. In some aspects, a user of the social messaging system 100 may encode an identifier within an image. The image may then be generated by the social networking system 100. The disclosed implementations may also decode the image to extract the encoded identifier. In some aspects, the identifier may be encoded within a ghost image.

Figure 3:
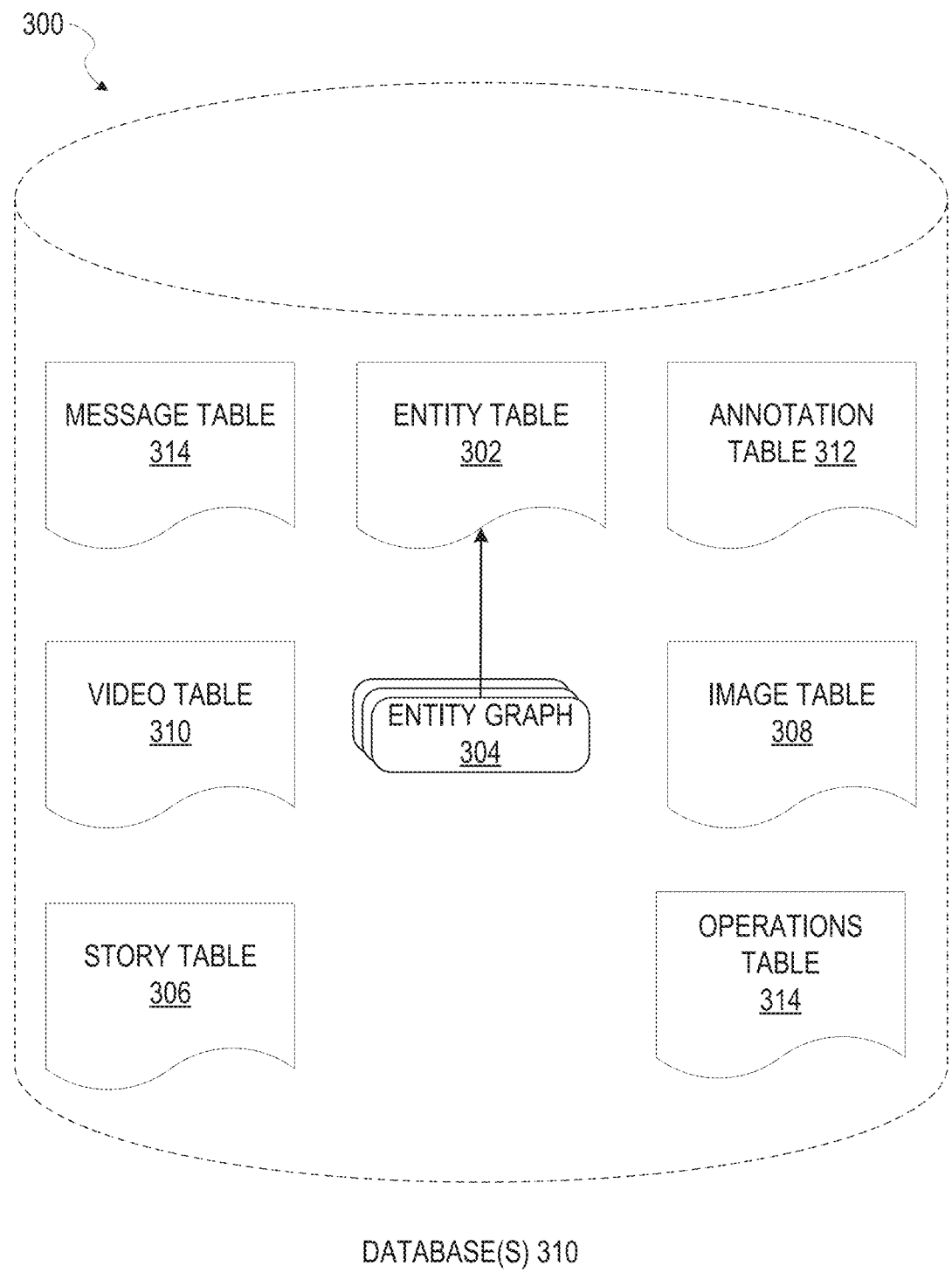
FIG. 3 is a schematic diagram illustrating data which may be stored in the database of the messaging server system, according to certain example embodiments.

FIG. 3 is a schematic diagram 300 illustrating data which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 614. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102, Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a created stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

The database 310 may also include an operations table 314. The operations table 314 may provide a mapping of bit strings to operations of the social network system 116. For example, the operations may include, for example, adding a friend to an account of a user, displaying a user interface dialog, enabling access to a defined set of content within an account of a user, or other operations. Each of the operations may be mapped to a unique identifier, such as a bit string. In some of the embodiments disclosed below, a user may create a mapping of a bit string to a particular operation for the user's account. The bit string may then be encoded into an image, such as a custom graphic as described in more detail below. When the bit string is decoded from the custom graphic by a second user, the decoded bit string may serve as an instructions for the social network system 116 to perform the operation mapped to the bit string via the operations table 315. In some other aspects, the operatons table may map a bit string to a series of instructions for the social network system 116. For example, the operations table may map a bit string to a plurality of java byte codes, common intermediate language (CIL) instructions, or SIL. Alternatively, the operations table 314 may map a bit string into scripting language instructions, such as any of Perl, python, ruby, java script, or ajax statements.

Figure 4:
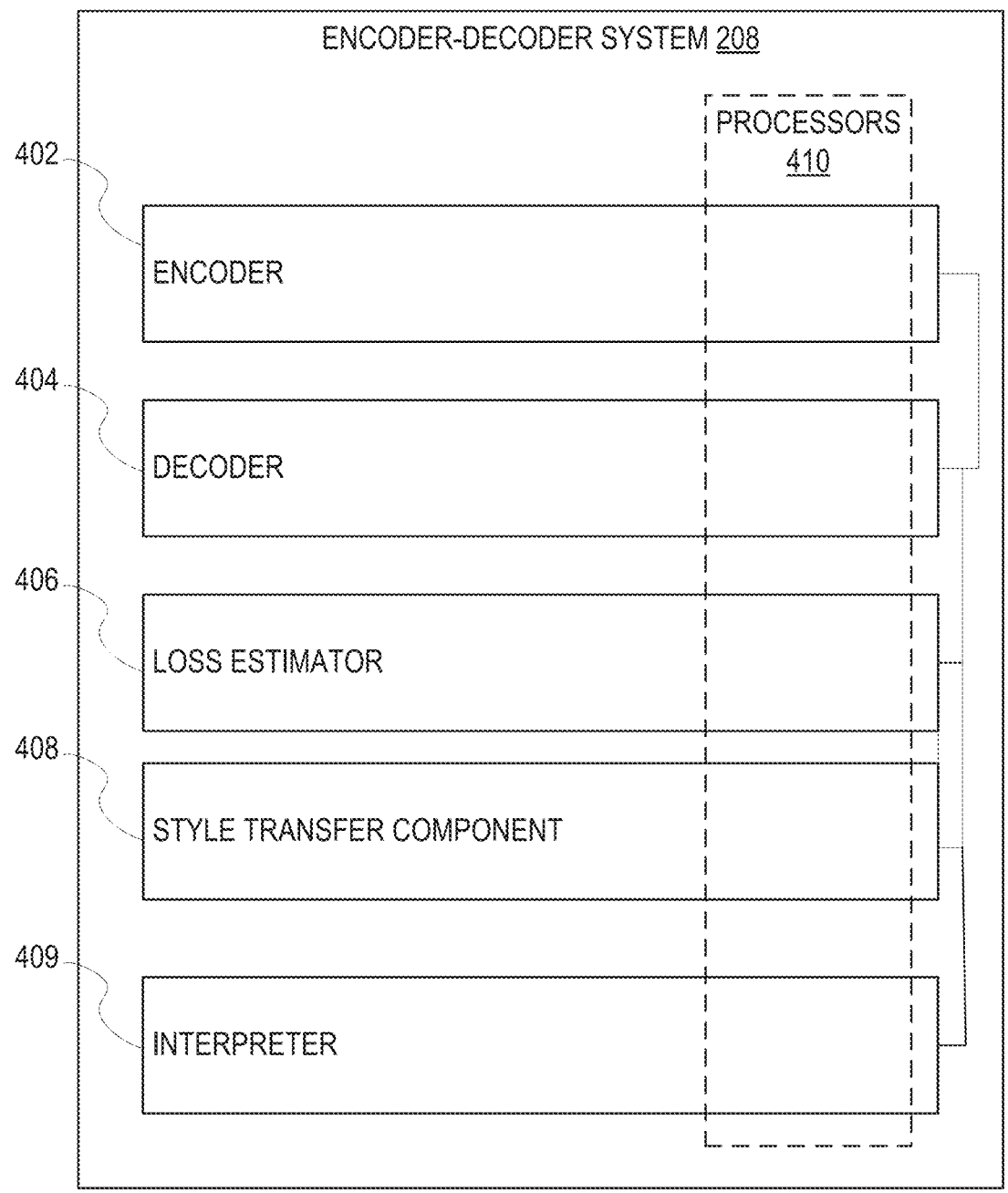
FIG. 4 is a block diagram illustrating functional components of a custom encoding system.

FIG. 4 is a block diagram illustrating functional components of the encoder-decoder system 208 that forms part of the messaging system 100, according to some example embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the encoder-decoder system 208 to facilitate additional functionality that is not specifically described herein. As shown, the encoder-decoder system 208 includes an encoder 402, decoder 404, loss estimator 406, a style transfer component 408, and an interpreter 410.

The encoder 402 may receive information indicating a bit string to be encoded within an image. The encoder may then convert the bit string information into visual information encoding the barcode.

The decoder 404 may receive an image included an encoded bit string. The encoded bit string may be within a graphic in some aspects. The decoder 404 may process image data within the graphic and identify an encoded bit string within the image data.

The loss estimator 406 estimates a loss between an encoded version of a bit stream and a decoded version of the encoded bit stream. In some aspects, the encoder and/or decoder may be trained based on one or more loss values determined by the loss estimator 406, as discussed further below.

The style transfer component 408 may transfer a style component of an image to separate image data encoding a bit string. The image data may be generated by the encoder 402.

The interpreter 409 may be configured to execute instructions decoded by the decoder 404. For example, the bit string decoded by the decoder 404 may represent intermediate language instructions, such as Java byte codes, common intermediate language (CIL), or Swift intermediate language (SIL). The decoder 404 may, in some aspects, pass the decoded bit string to the interpreter 409 which may then execute the instructions included in the bit string. In some other aspects, the decoded bit string may identify operations to be performed via the operations table 314. In this case, the interpreter 409 may lookup which operations are to be performed by using the operations table 314, and then cause those operations to be performed.

The above referenced functional components of the encoder-decoder system 208 are configured to communicate with each other (e.g., via a bus, shared memory, a switch, or APIs). Collectively, these components facilitate selective modification of content, such as stickers, to include a cloud texture, based at least in part, on a location of the content within an image.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the encoder-decoder system 208 may physically include an arrangement of one or more processors 410 (e.g., a subset of or among one or more processors of a machine) configured to perform the operations described herein for that component. As another example, any component of the encoder-decoder system 208 may include software, hardware, or both, that configure an arrangement of the one or more processors 410 to perform the operations described herein for that component. Accordingly, different components of the encoder-decoder system 208 may include and configure different arrangements of such processors 410 or a single arrangement of such processors 410 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components. Functional details of these components are described below with respect to at least FIGS. 5-10.

Figure 5:
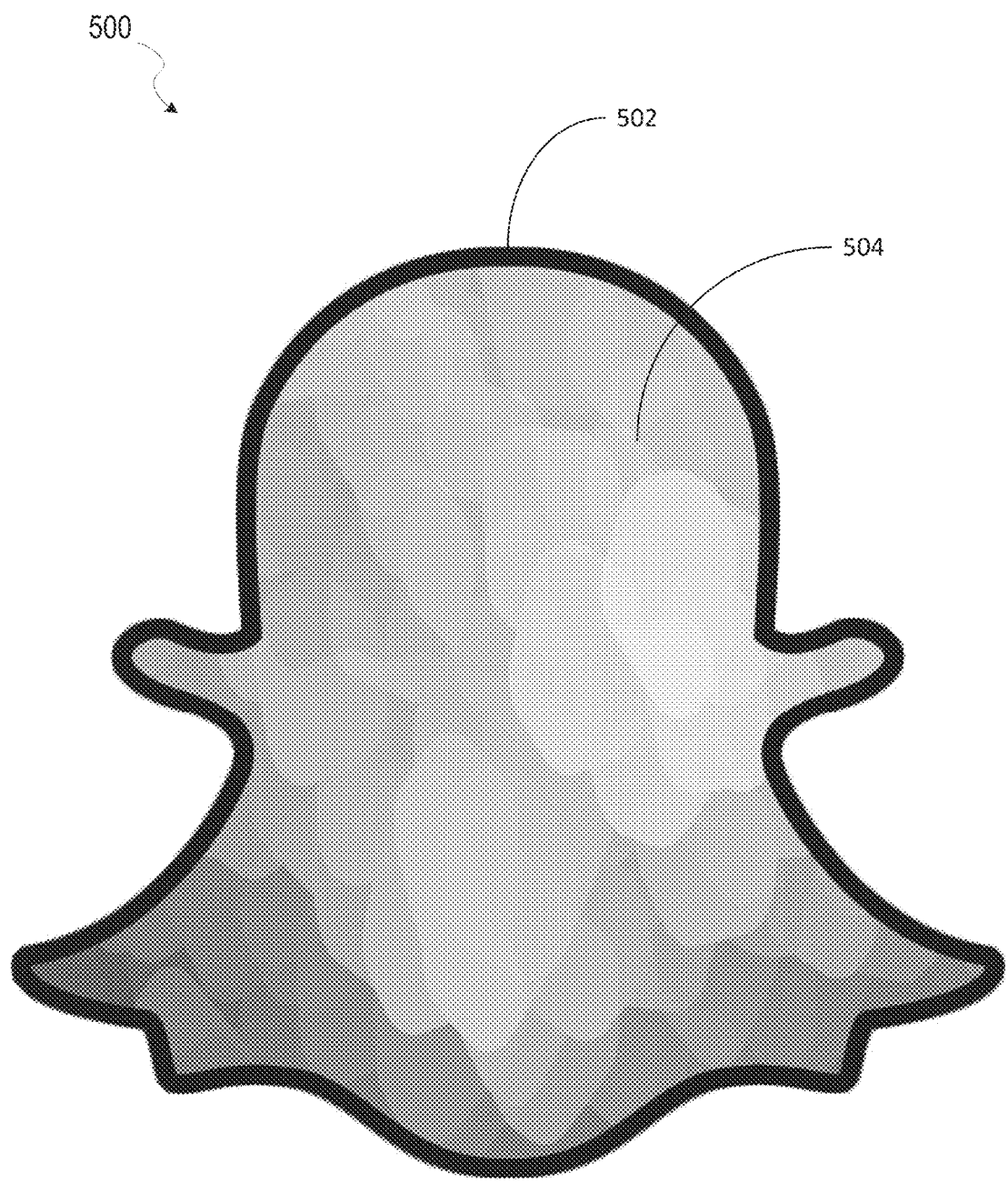
FIG. 5 is an example of a graphic according to at least some of the disclosed embodiments.

FIG. 5 is an example of image data encoding a bit string according to at least some of the disclosed embodiments. The image data 500 includes a visually appealing graphic 502. In the illustrated embodiment, the visually appealing graphic is a ghost outline. The graphic 502 includes a border 503 and an interior portion 504. The interior portion 504 may be substantially or completely surrounded by the border 503. Image data within the interior portion 504 may encode a bit string using the methods described in this disclosure. To detect the bit string, some embodiments may first detect the graphic 502 and/or the border 503. An example embodiment used to generate image data 500 is discussed in more detail with respect to FIG. 6.

Figure 6:
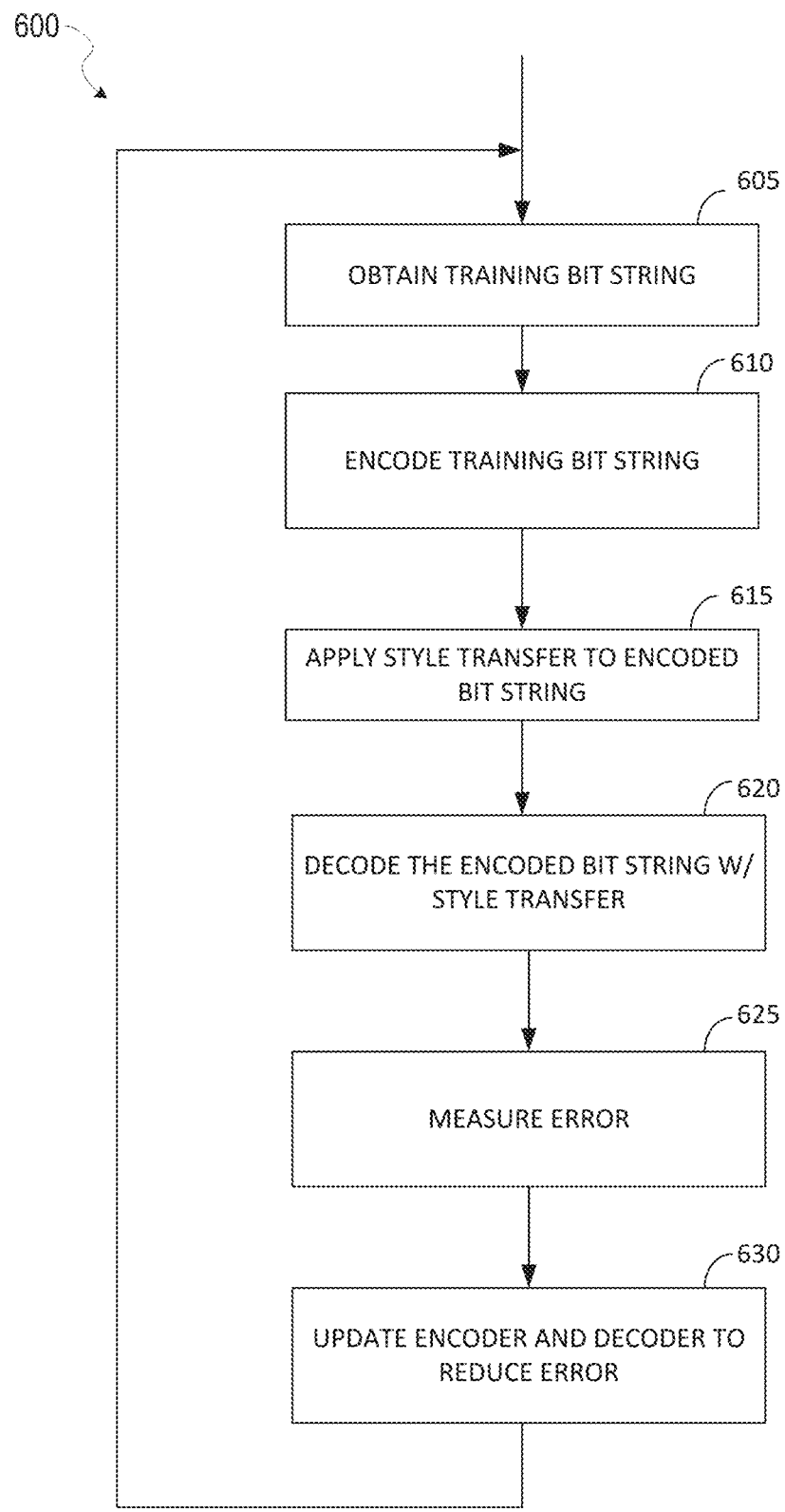
FIG. 6 is a flowchart of a method for training an encoder and a decoder.

FIG. 6 is a flowchart of a method for training an encoder and a decoder. In some aspects, one or more of the functions discussed below with respect to FIG. 6 may be performed by the processor(s) 410. In some aspects, these processor(s) 410 may be equivalent to the processing unit 954 discussed below with respect to FIG. 9 and/or the processor(s) 1004 discussed below with respect to FIG. 10. In some aspects, instructions, such as instructions 904 and/or 1010, discussed below, may configure the processor(s) to perform one or more of the functions discussed below with respect to process 600.

In block 605, a training bit string is obtained. In some aspects, the training bit string may be any bit string.

In block 610, the training bit string is encoded by an encoder. In some aspects, this includes converting an input bit sequence represented by the bit string into a visual representation of the bit string. The conversion may be based on a set of encoder parameters. In some aspects, the encoding of the bit string may utilize a multiplicative and up-convolutional layers. In some aspects, the encoder may be based on element-wise non-linearities. Example encoders may be found in A. Dosovitskuy, Springenberg, and T. Brox, *Learning to generate chairs with convolutional neural networks*, Conf. on Computer Vision and Pattern Recognition (CVPR), 2015, and M. D. Zeiler, G. W. Taylor, and R. Fergus, Adaptive deconvolutional networks for mid and high level feature learning, Int. Conf on Computer Vision (ICCV), pp 2018-2025, 2011.

In some aspects, the encoder used in block 610 may be the encoder 402. In some aspects, the encoder may include one or more convolution, polling, and deconvolution layers. Weights may be implemented so as to determine the convolution and deconvolution layers in a neural network of the encoder. In some aspects, one or more of the weights may be floating numbers. The weights may be initialized to random numbers, and then updated in successive iterations of process 600 based on a loss function as described below. In some implementations, the encoder may include the following layers described using TensorFlow™ syntax: dense layer at (32*32) units (e.g. a fully connected layer of output 32×32), reshare to 1, 32, 32, 1, convolution of 64 units, 3×3, max pooling at 2×2, stride 2, deconvolution at 64, 3×3, stride 2, convolution of 64 units, 3×3, max pooling at 2×2 stride 2, deconvolution at 64, 3×3, stride 2, convolution of 64 units, 3×3, max pooling at 2×2 stride 2, deconvolution at 3, 3×3, stride 2. In some aspects, the encoder returns an image tensor having dimensions of (1, 32, 32, 3). In some aspects, a hyperbolic tangent*12.5±255/2 is returned.

In some aspects, the encoder may encode a bit sequence containing n bits into an image having a size of m by m (in other words, an image having equivalent dimensions on all sides (a square).

In block 615, a style transfer is applied to the encoded bit string. For example, a style from a style image may be applied to the encoded bit string. In some aspects, block 615 may apply the method described in Johnson, Justin, et. al, *Perceptual Losses or Real-Time Style Transfer and Super-Resolution*, Stanford University. For example, block 615 may rely on two components: an image transformation network fw and a loss network φ that is used to define several loss functions $l_1, \ldots l_k$. The image transformation network may be a deep residual convolutional neural network parameterized by weights W; it transforms input images x into output images ŷ via the mapping ŷ=fw(x). Each loss function computes a scalar value $l_i(ŷ, y_i)$ measuring the difference between the output image ŷ and a target image $y_i$. The image transformation network may be trained using a stochastic gradient descent to minimize a weighted combination of loss functions:

$$W^* = \arg\min_{w} E_{x,\{yi\}}\left[\sum_{i=1} \lambda_i l_i(f_W(x), y_i)\right]$$

Where:
$\lambda_i$ is a predefined weight for layer i
$l_i$ is a loss for layer i
E is an expectation (e.g. average loss over training images)

To address shortcomings of per-pixel losses and allow loss functions to measure perceptual and semantic differences between images, some implementations apply convolutional neural networks pretrained for image classification that have already learned to encode the perceptual and semantic information to be measured in one or more loss functions. Therefore in some aspects, a network φ defines a feature reconstruction loss $l_{feat}^\phi$ and style reconstruction loss $l_{style}^\phi$ that measure differences in content and style between images. For each input image x we have a content target $y_c$ and a style target $y_s$. For style transfer the content target $y_c$ is the input image x and the output image combines the content of x=$y_c$ with the style of $y_s$; we train one network per style target. For super-resolution the input x may be a low-resolution input, the content target $y_c$ may be a ground-truth high-resolution image, and style reconstruction loss may not be used; in some aspects, one network per super-resolution factor is trained.

In some aspects, functions defining the style of the image may be taken from Gatys, et. al, *Image Style Transfer Using Convolutional Neural Networks*, available at haps://www.cv-foundation.org/openaccess/content_cvpr_2016/papers/Gatys_Image_Style_Transfer_CVPR_2016_paper.pdf (last visited Jun. 27, 2018), the content of which is hereby incorporated by reference in its entirety. For example, transferring a style from one image to another may be a problem of texture transfer, and thus, a goal may be to synthesize a texture from a source image while constraining the texture synthesis to preserve semantic content of a target image. In some aspects, a style of an input image may be represented via different subsets of a convolutional neutral network. For example, as defined by Gatys, one style representation includes ("conv 'conv1 1'(a), 'conv1 1' and 'conv2 1' (b), 'conv1 1', 'conv2 1' and 'conv3 1' (c), 'conv1 1', 'conv2 1', 'conv3 1' and 'conv4 1' (d), 'conv1 1', 'conv2 1', 'conv3 1', 'conv4 1' and 'conv5 1' (e)). A style representation of a given image may be designed to match the style of the given image on an increasing scale while discarding information of the global arrangement of a scene represented by the given image. Some representations of a style of an image may include a parametric texture model based on a convolutional neural network and a method that inverts an image representation.

As described by Gaty's, some embodiments may obtain a representation of a style of an image by utilizing a feature space designed to capture texture information. This feature space can be built on top of filter responses in any layer of the network. It may include correlations between different filter responses, where the expectation is taken over the spatial extent of the feature maps. These feature correlations are given in some aspects by a Gram matrix $G^l \in R^{Nl \times Nl}$, where $G_{ij}^l$ is the inner product between a vectorized feature maps i and j in layer l:

$$G_{ij}^l = \Sigma_k F_{ik}^l F_{jk}^l$$

As explained by Gatys, by including feature correlations of multiple layers, stationary multi-scale representation of the input image is obtained, which captures its texture information but not the global arrangement.

In block 620, the encoded bit string (with the new style) is decoded by a decoder. In some aspects, the encoded bit string is decoded by the decoder 404. In some aspects, the decoding of block 620 is performed by a recognizer network that is a feedforward convolutional network having one output unit and n dimensions. The decoder may also have weights that define convolution and deconvolution layers in a neural network implemented by the decoder.

The loss function may a vector of differences between each bit in the string. Such a recognizer network is disclosed in Y. LeCun, B. Boser, Denker, D. Henderson, R. E. Howward, W. Hubbard, and L. D. Jackel, *Backpropagation applied to handwritten zip code recognition*, Neural computation, 1(4):541-555, 1989. In some aspects, the recognizer network includes the following layers, convolution of 64 filters at 3×3, convolution of 64 filters at 3×3, pooling filter stride 2, 2×2, convolution of 64 filters at 3×3, convolution of 64 filters at 3×3, pooling filter stride 2, 2×2, convolution of 64 filters at 3×3, convolution of 64 filters, 3×3, pooling filter stride 2, 2×2, dense layer at 128 units, dense layer at n units (e.g. n=9), In some aspects, the decoder is configured to return a bit string of n dimensions.

In block 625, an error in the encoding of block 610, style transfer of block 615, and decoding of block 620 is measured. In some aspects, the error is measured by:

$$L(b, r) = -\frac{1}{n}\sum_{i=1}^{n} \sigma(b_i r_i) = -\frac{1}{n}\sum_{i=1}^{n} \frac{1}{1 + \exp(-b_i r_i)}$$

where the decoder infers a real-valued sequence r= $\{r_2, r_2, \ldots, r_n\}$ from an image containing a representation of the bit string b=$\{b_1, b_2, \ldots b_n\}$, where the bit string b may be encoded by the encoder discussed above with respect to block 610. n is the number of bits in the bit string. The loss L(b,r) is distributed between −1 (perfect recognition) and 0. Another example loss function is provided in Grinchuk, Oleg, et. al, *Learnable Visual Markers*, Sholkovo Institute of Science and Technology, Moscow, Russia, and Yandex, Moscow, Russia.

In block 630, an encoder and a decoder are updated to minimize the error. Minimizing the error may include updating the weights of the encoder and or the decoder discussed above based on the loss. For example, in some aspects, block 630 may determine which weights of the encoder and decoder contributed to the error or loss. In some aspects, this may be determined based on a derivative of the loss value for a particular layer divided by a derivative of a weight for that layer, or, in other words $$\frac{dL}{dW},$$

where W is a weight at a particular layer and L is a loss or error at the particular layer. In some aspects, minimizing the loss may include updating the weights so that they change in an opposite direction of the gradient. For example, the new weight for a particular layer may be determined via:

$$W = w_i - \eta \frac{dL}{dW}$$

Where:
W is a weight for a particular layer
$w_i$ is an initial weight for the layer
η is a learning rate parameter (larger rates take larger steps, and it thus may require fewer iterations to converge on a trained model. The tradeoff is less a less accurate model when compared to a lower value of η.

The updated encoder may be the encoder 402. The updated decoder may be the decoder 404. In some aspects, the minimization of the loss can be accomplished using a stochastic gradient descent algorithm similar to the one discussed above with respect to the style transfer. Such an algorithm is disclosed in D. P. Kingma. and M. Welling, *Auto-encoding variational bayes*, International Conference on Learning Representations, 2015. In some aspects, the error is back-propagated to two neural networks (one for encoder and one for decoder), which may update the weights in each of the two neural networks. A normal optimization may be performed to minimize the loss function indicated by the error.

After block 625, process 600 may return to block 605, which obtains another training bit string. Alternatively, after a number of iterations, process 600 may exit. In some aspects, process 600 may exit when iterative losses are no longer being reduced. For example, when a difference between a first loss of a first iteration and a second loss of a subsequent second iteration is below a threshold value, the training of the encoder and decoder may be considered complete.

Figure 7:
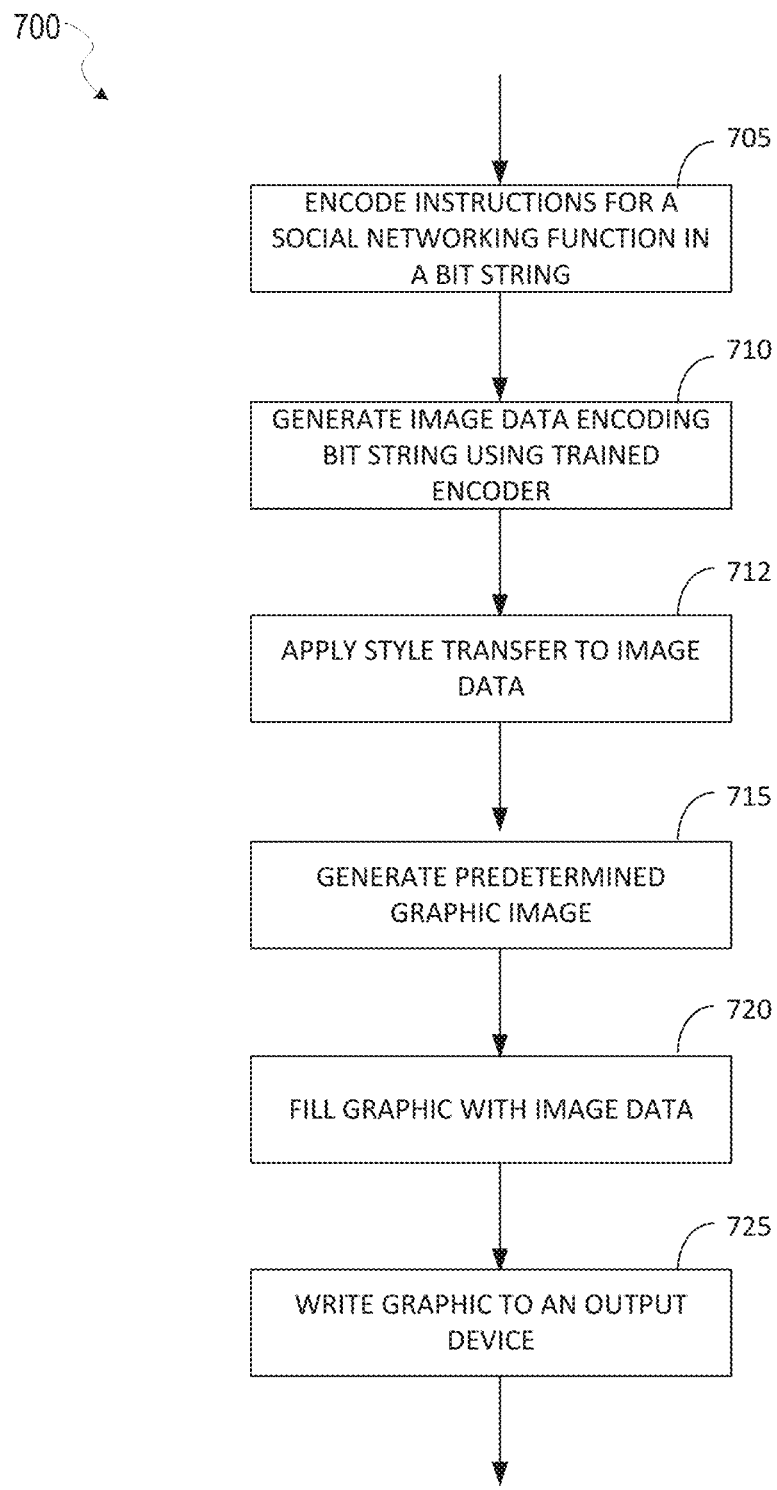
FIG. 7 is a flowchart of a method of encoding a bit string.

FIG. 7 is a flowchart of a method of encoding a bit string. In some aspects, one or more of the functions discussed below with respect to process 700 and FIG. 7 may be performed by the processor(s) 410. In some aspects, these processor(s) 410 may be equivalent to the processing unit 954 discussed below with respect to FIG. 9 and/or the processor(s) 1004 discussed below with respect to FIG. 10. In some aspects, instructions, such as instructions 904 and/or 1010, discussed below, may configure the processor(s) to perform one or more of the functions discussed below with respect to process 700 and FIG. 7.

In block 705, instructions for a social networking function are encoded into a bit string. In some aspects, block 705 may be performed on behalf of a first user of the social network system 116. In some aspects, the bit string may literally represent instructions for the social network system 116. For example, in some aspects, the bit string may represent intermediate code, such as Java byte codes, Common Intermediate Language (CIL) or Swift intermedia language (SIL). In some aspects, the bit string encodes an identifier, and the identifier maps to one or more social networking functions. For example, the social network system 116 may maintain a database of identifiers, each of which is mapped to one or more operations within the social network system 116. One example of such a database is the operations table 314, discussed above with respect to FIG. 3. These operations could include, for example, adding a second user that scans the bit string as a friend of the first user of the social network system 116, display a particular user interface of the social network system 116, which may present one or more functional options to the second user scanning the bit string. For example, a one user interface that may be displayed may provide for payment by the scanning second user to a payment account for the first user. Another user interface may provide for displaying particular content within the account of the first user. For example, the first user may encode the bit string to identify a particular story or group of content of the first user. Upon scanning an image encoding the bit string, the second user scanning the bit string may be provided with a user interface that allows the second user to view the particular story or group of content identified by the first user. In some aspects, the bit string is nine bits long. Alternatively, the bit string may store the nine bits in a non-binary format, and thus may be longer than nine bits. In some aspects, the bit string may be any length, and is not limited to nine (9).

In block 710, image data is generated. The image data is generated so as to encode the bit string. The bit string may be encoded by a trained encoder, such as the encoder 402.

In block 712, a style is transferred to the image data. In some aspects, a sample image including a desired style may be used as a basic for the style transfer. As discussed above, the style transfer may be accomplished by minimizing a difference between a style component of the sample image and a style component of the image data by modifying the image data. Concurrently, a difference between a content component of the modified image data may be minimized with respect to a second content component of the unmodified image data. Some implementations may apply one or more of the style transfer methods discussed in Johnson, supra. In some aspects, the style component of both the sample image and image data may be based on feature correlations between multiple layers of a convolutional neural network applied to both the sample image and the image data. In some aspects, the methods of Gatys, discussed above, may be used to transfer the style of the sample image to the image data while preserving content elements of the image data. The content may be preserved by minimizing a difference between a content function of the image data below and after modification to incorporate the style of the sample image.

In block 715, a predetermined graphic image is generated. For example, in some aspects, a graphic image such as the graphic 502 shown in FIG. 5 may be generated. The graphic may include a border, which substantially surrounds a perimeter of the graphic. In some aspects, the border may completely surround the perimeter of the graphic.

In block 720, the graphic is filled based on the image data. For example, as discussed above with respect to FIG. 5, the graphic 502 may be generated, and the graphic 502 may be filled in with image data 504. Filling the graphic based on the image data may include filling an interior portion of the graphic, for example, within the border discussed above with respect to 715, with the image data. In some aspects, the image data may be repeated as necessary to completely till the area within the border. In some aspects, the filled portion of the graphic may be in black and white form. In other aspects, the graphic may include color data.

Figure 8:
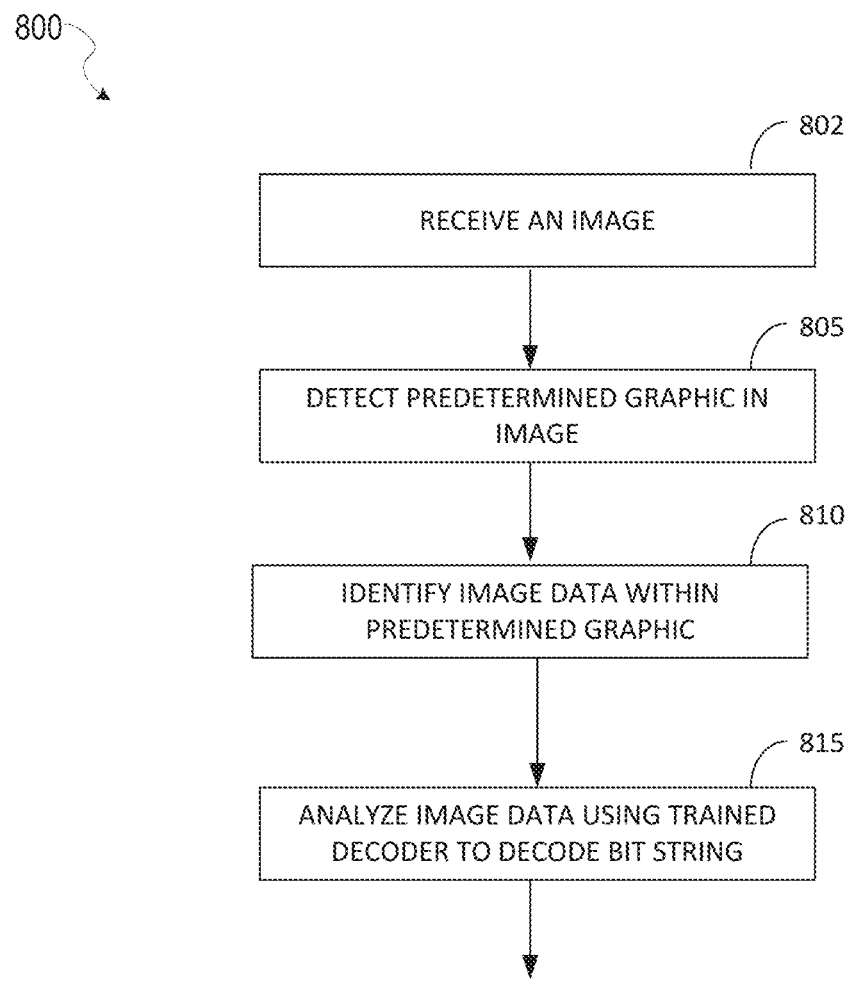
FIG. 8 is a flowchart of a method of decoding a bit string from image data.

FIG. 8 is a flowchart of a method of decoding a bit string from image data. In some aspects, one or more of the functions discussed below with respect to FIG. 8 may be performed by the processor(s) 410. In some aspects, these processor(s) 410 may be equivalent to the processing unit 954 discussed below with respect to FIG. 9 and/or the processor(s) 1004 discussed below with respect to FIG. 10. In some aspects, instructions, such as instructions 904 and/or 1010, discussed below, may configure the processor(s) to perform one or more of the functions discussed below with respect to process 800 and FIG. 8.

In block 802, an image is received. The image may be received or captured by a device of a first user of the social network system 116. In some aspects, the image may be received from an image sensor, a stable storage, or a network. In some aspects, the image received in block 802 may represent a graphic as generated in block 720. The image received in block 802 may have been created or otherwise encoded by a second user of the social network system 116, in block 805, a graphic is detected in an image. For example, as discussed above with respect to FIG. 5, a graphic (e.g. 502) may be filled with image data (e.g. 504) encoding a bit string in some aspects of this disclosure.

In some aspects, block 805 may search the image data of the image for a custom graphic. In an example embodiment, block 805 searches for the custom graphic by extracting a candidate shape feature, or multiple candidate shape features, from the image data. For example, block 805 may perform an edge detection technique, or another image processing technique, to identify the candidate shape feature such as a contour line of the image. Block 805 then determines whether the candidate shape feature satisfies shape feature rules or criteria. For instance, if a particular candidate shape feature is a contour line, the custom pattern system can determine whether the contour line is an enclosed line that encircles a portion of the image. Consistent with some embodiments, the shape feature rules filter out irrelevant or extraneous candidate shape features or candidate shape features with a low probability of being the custom graphic. Alternatively, instead of using a candidate shape to recognize the custom pattern, facial recognition technology can be used to identify a face.

In response to a candidate shape feature satisfying shape feature rules, block 805 identifies the custom graphic by comparing the candidate shape feature with a reference shape feature of the custom graphic. For example, the custom pattern system can compare an area or size of the candidate shape feature with a reference area or size of the reference shape feature. In this example, block 805 identifies the custom graphic based on a match or near match (e.g., a percentage match above a threshold) between the candidate shape feature and the reference shape feature.

In block 810 image data within the graphic is detected. For example, the image data 504 of FIG. 5 may be detected within the graphic 502. In some aspects, the image data may be data inside a custom graphic, such as the image data 504 inside the custom graphic 502 shown in FIG. 5. In some aspects, the image data may be detected by first detecting a border that substantially surrounds the custom graphic, with the image data determined to be any data within the border.

In block 815, the image data is analyzed to detect a bit string. In some aspects, the decoder 404 may analyze the image data to detect the bit string. As discussed above, the decoder may be a trained decoder. The trained decoder may be a feedforward convolutional network with n output units. Such a decoder is described in Y. LeCun, supra. In some aspects, the decoder may extract content data from the image while ignoring style data. The content data may then be analyzed to detect the bit string using the decoder. In some aspects, content may be extracted from the image data using one or more of the methods of Gatys, discussed above.

Once the bit string is decoded, it may be used to retrieve a variety of information from a data store. For example, the bit string may identify a particular operation to perform for a particular user account in some aspects. For example, in some aspects, the decoded bit string may identify one or more operations for the social network system 116 to perform via the operations table 314 in some aspects. In some aspects, the bit string may function to instruct the social network system 116 to add a first user to an account of a second user. Alternatively, the bit string may instruct the social network system 116 to display a particular user interface upon decoding of a custom graphic (e.g. 502) encoding the bit string. For example, the particular user interface identified may display and/or provide a number of options for selection by a user capturing an image of the custom graphic detected in block 805, In some aspects, the bit string may selectively enable or disable certain features of the social network system 116 with respect to a user capturing or receiving the image in block 802. For example, the bit string may instruct the social network system 116 to enable one or more image filters for the user receiving or capturing the image of block 802. In some aspects, the decoded bit string may be passed to the interpreter 409, which may execute instructions represented by the bit string. The instructions may be encoded in the bit string itself, or alternatively, the operations table 314 may store a mapping of the bit string to a set of instructions to be executed upon decoding of the bit string. The instructions may be in a variety of forms, including, as discussed above, an intermediate language such as Java byte codes, CIL, or SU. Alternatively, the instructions may be in a source language format or script language format such as Perl, Ajax, Ruby, or Python source code statements in some aspects. The instructions may perform any number of social networking functions provided by the interpreter 409. For example, the intermediate language encoded in the hit string may cause the social network to display a particular user interface, add a friend to a user scanning the bit string, display a promotion, display a photo album, or any other social network action.

Software Architecture

Figure 9:
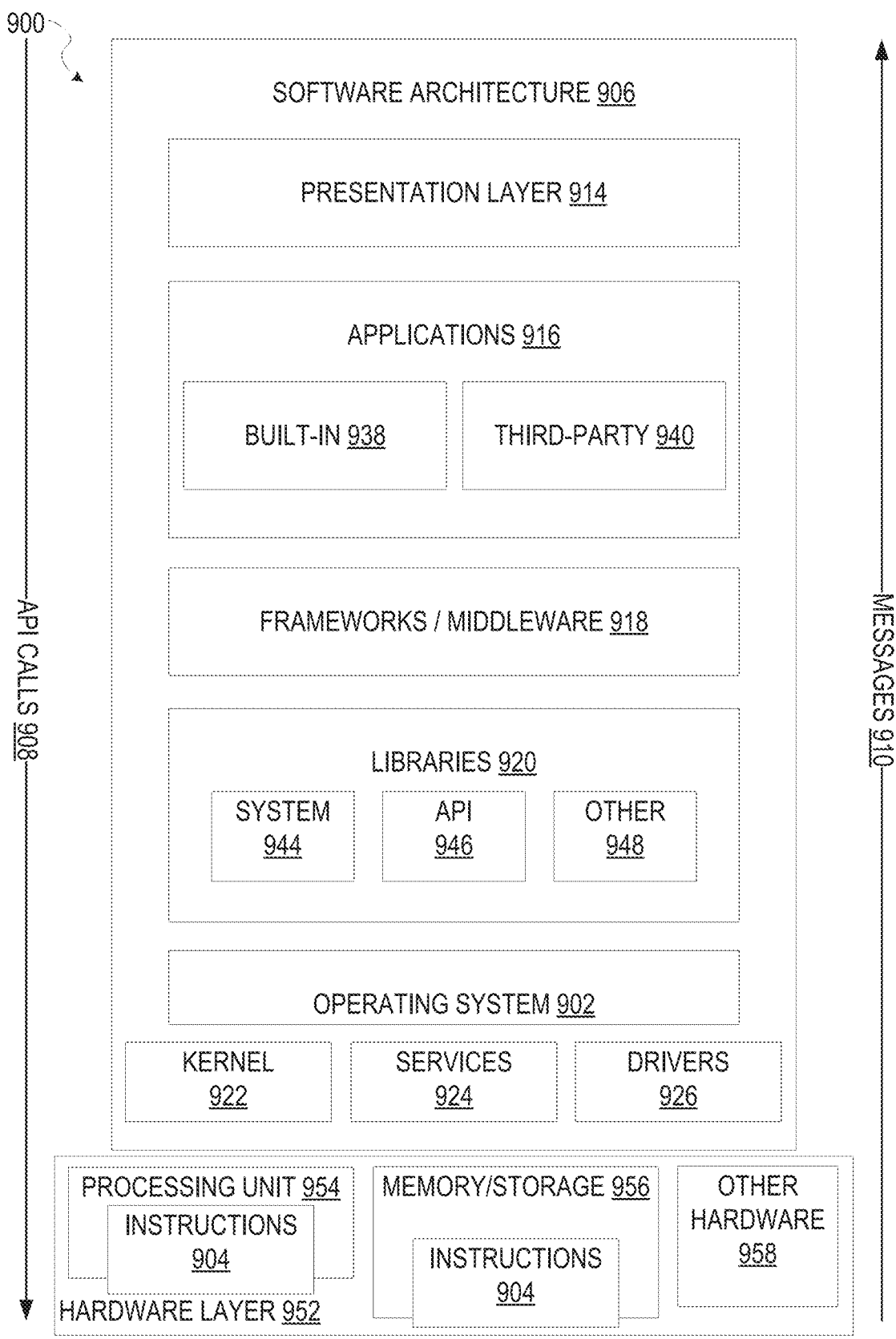
FIG. 9 is a block diagram illustrating an example software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as a machine 1000 of FIG. 10 that includes, among other things, processors 904, memory/storage 906, and I/O components 918. A representative hardware layer 952 is illustrated and can represent, for example, the machine 1000 of FIG. 10. The representative hardware layer 952 includes a processing unit 954 having associated executable instructions 904. The executable instructions 904 represent the executable instructions of the software architecture 906, including implementation of the methods, components, and so forth described herein. The hardware layer 952 also includes memory and/or storage 956, which also have the executable instructions 904. The hardware layer 952 may also comprise other hardware 1258.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CNC) processor, a Graphics Processing Unit (GPU), a Digital Signal Processor (DSP), an ASIC, a Radio-Frequency Integrated Circuit (RFIC), or any combination thereof. A processor may further be a multicore processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly, configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an APO. The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive a response as messages 910. The layers illustrated are representative in nature and not all software architectures have all layers. For example, some mobile or special-purpose operating systems may not provide a frameworks/middleware 918 layer, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than by interfacing directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. The third-party, applications 940 may include an application developed using the ANDROID™ or IOS™ software development kit (SDK) by an entity other than the vendor of the particular platform, and may be mobile software running on a mobile operating system such as ANDROID™, WINDOWS® Phone, or other mobile operating systems. The third-party applications 940 may invoke the API calls 908 provided by the mobile operating system (such as the operating system 902) to facilitate functionality described herein.

The applications 916 may use built-in operating system functions (e.g., kernel 922, services 924, and/or drivers 926), libraries 920, and frameworks/middleware 918 to create user interfaces to interact with users of the system. Alternatively, or additionally, in some systems interactions with a user may occur through a presentation layer, such as the presentation layer 914. In these systems, the application/component "logic" can be separated from the aspects of the application/component that interact with a user.

Exemplary Machine

Figure 10:
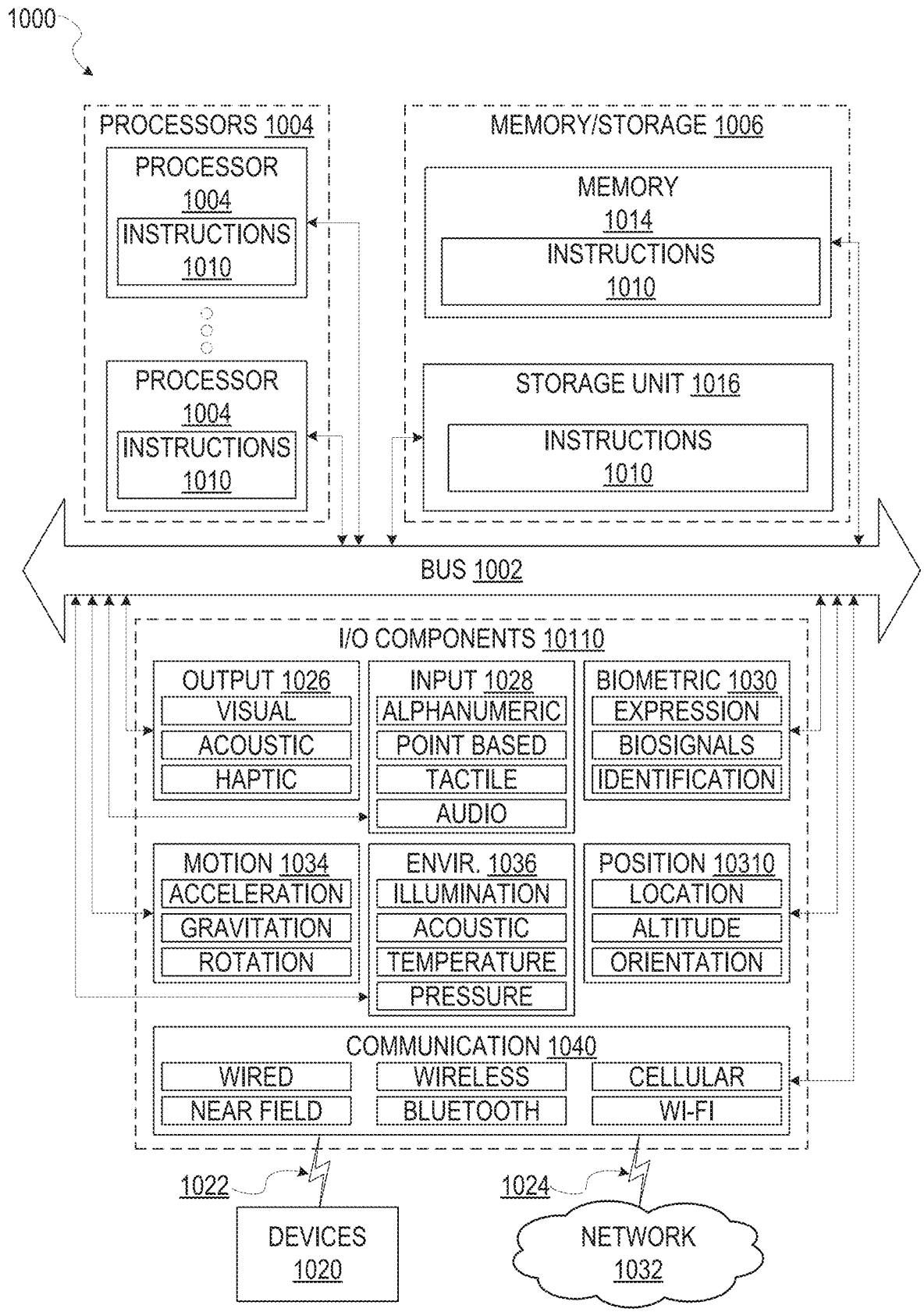
FIG. 10 is a block diagram illustrating exemplary components of a machine

FIG. 10 is a block diagram illustrating exemplary components (also referred to herein as "modules") of a machine 1000. In some aspects, the machine is configured to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an apples, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (FDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of the processors 1004 are examples of machine-readable media. In some aspect, the processors 202 and processors 1004 may be the same processors.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

The I/O components 1018 may include a wide variety of components to provide a user interface for receiving input, providing output, producing output, transmitting information, exchanging information, capturing measurements, and so on. The specific I/O components 1018 that are included in the user interface of a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various exemplary embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1028 may also include one or more image-capturing devices, such as a digital camera for generating digital images and/or video.

In further exemplary embodiments, the I/O components 1018 may include biometric components 1030, motion components 1034, environment components 1036, or position components 1038, as well as a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via a coupling 1024 and a coupling 1022 respectively. For example, the communication components 1040 may include a network interface component or other suitable device to interface with the network 1032. In further examples, the communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

We claim:

1. A method comprising:
    accessing a set of bits;
    generating using an encoder, image data encoding the set of bits, the encoder trained to minimize a loss in relation to training data to update a first set of weights defining convolution and deconvolution layers of the encoder based on the loss, and to update a second set of weights defining convolution and deconvolution layers of a decoder based on the loss;
    incorporating, by hardware processing circuitry, characteristics of a style from a sample image into the image data, wherein the incorporating the characteristics of the style from the sample image into the image data comprises minimizing a first loss function of the style and a second style of the image data by modifying the image data, and minimizing a second loss function of first content of the image data and second content of the modified image data;
    generating a graphic image based on the image data that encodes the set of bits and comprises characteristics of the style; and
    associating the set of bits with an operation to be performed, by a social network, upon decoding of the encoded set of bits.

2. The method of claim 1, wherein the decoder is trained to minimize the loss in relation to training data being decoded by the decoder.

3. The method of claim 1, further comprising writing the graphic image to an output device.

4. The method of claim 1, wherein the style of the sample image and a second style of the image data are based on feature correlations between multiple layers of a convolutional neural network applied to each of the sample image and the image data respectively.

5. The method of claim 1, wherein the convolutional layers of the encoder comprise:
   a) dense layer at (32*32) units
   b) reshape to 1, 32, 32, 1
   c) convolution of 64 units, 3×3
   d) max pooling at 2×2, stride 2
   e) deconvolution at 64, 3×3, stride 2
   f) convolution of 64 units, 3×3
   g) max pooling at 2×2 stride 2
   h) deconvolution at 64, 3×3, stride 2
   i) convolution of 64 units, 3×3
   j) max pooling at 2×2 stride 2
   k) deconvolution at 3, 3×3, stride 2.

6. The method of claim 1, wherein the encoder is configured to return an image tensor of (1, 32, 32, 3) based on a hyperbolic tangent.

7. The method of claim 1, wherein the decoder includes layers comprising:
   a) convolution of 64 filters at 3×3
   b) convolution of 64 filters at 3×3
   c) pooling filter stride 2, 2×2
   d) convolution of 64 filters at 3×3
   e) convolution of 64 filters at 3×3
   f) pooling filter stride 2, 2×2
   g) convolution of 64 filters at 3×3
   h) convolution of 64 filters, 3×3
   i) pooling filter stride 2, 2×2
   j) dense layer at 128 units
   k) dense layer at 9 units.

8. The method of claim 1, wherein the decoder is configured to return a tensor of shape (1,1,1,9).

9. The method of claim 1, wherein the loss is minimized via a stochastic gradient descent algorithm.

10. A system, comprising:
    hardware processing circuitry;
    a hardware memory storing instructions that when executed configure the hardware processing circuitry to perform operations comprising:
    accessing a set of bits;
    generating using an encoder, image data encoding the set of bits, the encoder trained to minimize a loss in relation to training data to update a first set of weights defining convolution and deconvolution layers of the encoder based on the loss and to update a second set of weights defining convolution and deconvolution layers of a decoder based on the loss;
    incorporating, by hardware processing circuitry, characteristics of a style from a sample image into the image data, wherein the incorporating the characteristics of the style from the sample image into the image data comprises minimizing a first loss function of the style and a second style of the image data by modifying the image data, and minimizing a second loss function of first content of the image data and second content of the modified image data; and
    generating a graphic image based on the image data that encodes the set of bits and comprises characteristics of the style; and
    associating the set of bits with an operation to be performed, by a social network, upon decoding of the encoded set of bits.

11. The system of claim 10, wherein the decoder is trained to minimize the loss in relation to training data being decoded by the decoder.

12. The system of claim 10, the operations further comprising writing the graphic image to an output device.

13. The system of claim 10, wherein the style of the sample image and a second style of the image data are based on feature correlations between multiple layers of a convolutional neural network applied to each of the sample image and the image data respectively.

14. The system of claim 10, wherein the convolutional layers of the encoder comprise:
    a) dense layer at (32*32) units
    b) reshape to 1, 32, 32, 1
    c) convolution of 64 units, 3×3
    d) max pooling at 2×2, stride 2
    e) deconvolution at 64, 3×3, stride 2
    f) convolution of 64 units, 3×3
    g) max pooling at 2×2 stride 2
    h) deconvolution at 64, 3×3, stride 2
    i) convolution of 64 units, 3×3
    j) max pooling at 2×2 stride 2
    k) deconvolution at 3, 3×3, stride 2.

15. The system of claim 10, wherein the encoder is configured to return an image tensor of (1, 32, 32, 3) based on a hyperbolic tangent.

16. A non-transitory computer readable medium comprising non-transitory computer readable instructions that, when executed by one or more processors, configured the one or more processors to perform operations comprising:
    accessing a set of bits;
    generating using an encoder, image data encoding the set of bits, the encoder trained to minimize a loss in relation to training data to update a first set of weights defining convolution and deconvolution layers of the encoder based on the loss and to update a second set of weights defining convolution and deconvolution layers of a decoder based on the loss;
    incorporating, by hardware processing circuitry, characteristics of a style from a sample image into the image data, wherein the incorporating the characteristics of the style from the sample image into the image data comprises minimizing a first loss function of the style and a second style of the image data by modifying the image data, and minimizing a second loss function of first content of the image data and second content of the modified image data; and
    generating a graphic image based on the image data that encodes the set of bits and comprises characteristics of the style;
    associating the set of bits with an operation to be performed, by a social network, upon decoding of the encoded set of bits.

* * * * *